May 16, 1944.  G. L. WADDELL  2,349,024
STUFFING BOX SEAL
Filed Feb. 2, 1942

Inventor
Gasper L. Waddell
By
E. V. Hardway,
Attorney

Patented May 16, 1944

2,349,024

UNITED STATES PATENT OFFICE 2,349,024

STUFFING BOX SEAL

Gasper L. Waddell, Goose Creek, Tex.

Application February 2, 1942, Serial No. 429,195

2 Claims. (Cl. 286—7)

This invention relates to a stuffing box seal.

An object of the invention is to provide a seal of the character described specially designed for the shaft of a centrifugal pump for sealing off the fluid around the shaft.

More particularly the invention relates to the prevention of leakage of fluid from a centrifugal pump handling liquids under high temperatures and pressures.

By the use of the present invention, a centrifugal pump may be used for pumping liquified hydro-carbons, and similar liquids, not having lubricating properties without danger of failure of the pump at the shaft seal. At the present time the seal of the ordinary centrifugal pump shaft is maintained under the required pressure by a multiplicity of springs which apply pressure on suitable packing material. This type of sealing means is not reliable since failure often occurs at the face of the coupling joint because no provision is made for lubricating the opposing metallic parts and further for the reason that the springs often become fouled and for this and other reasons do not apply a uniform pressure to the packing. It is also common to pack about the shaft of the centrifugal pump by means of a stuffing box gland for applying pressure to packing material about the shaft by means of stud bolts and adjusting nuts thereon. This type of packing and adjusting means is unsatisfactory since failure often occurs after a period of usage due to the packing material losing its ability to seal off the liquid being pumped. The packing material, after a time, hardens and any further adjustment of the nuts on the stud bolts fails to insure proper sealing. No provision is made for lubrication in either of the above referred to types of sealing structure and this also accounts for failures that frequently occur in these installations.

It is an object of the present invention to provide a stuffing box seal of the character described wherein the above referred to objections have been overcome.

Other advantages will be evident from the following specification illustrated by the accompanying drawing, wherein.

Figure 2:
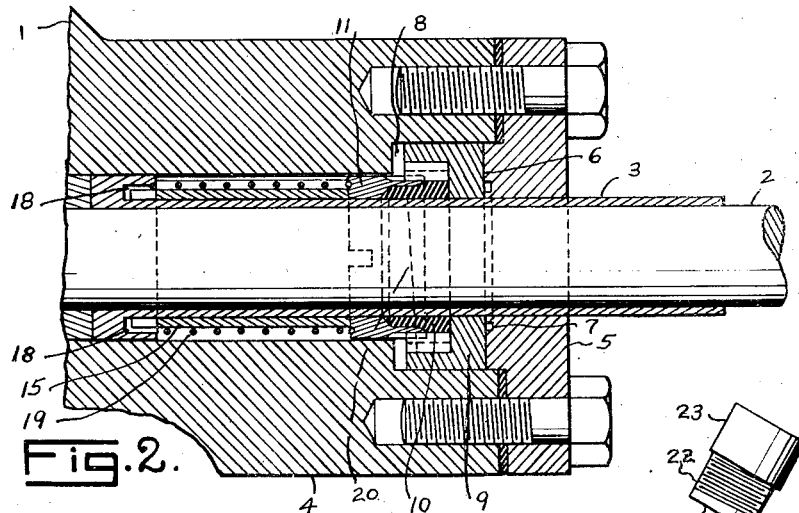
Figure 2 shows an enlarged, fragmentary, sectional view thereof.
Figure 3:
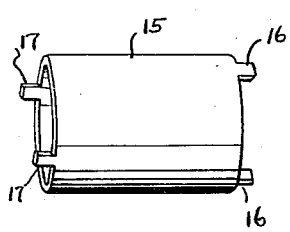
Figure 3 shows a perspective view of the driving sleeve.
Figure 4:
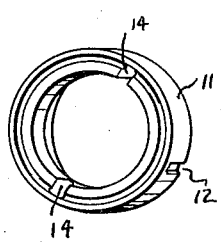
Figure 4 shows a perspective view of the packing gland.
Figure 6:
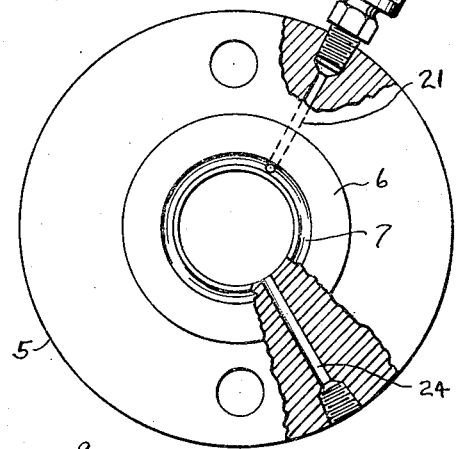
Figure 6 shows an elevational view of the thrust seat of the outer end cap which is shown partly in section.
Figure 1:
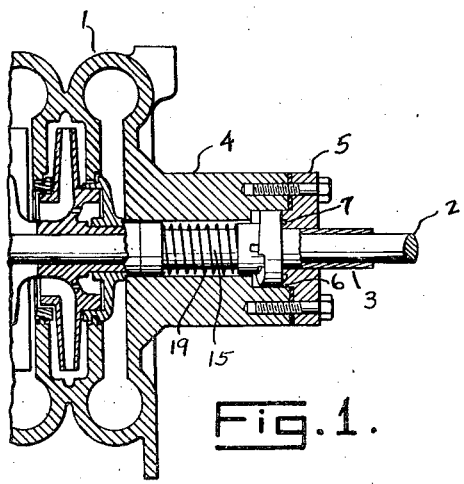
Figure 1 shows a fragmentary, sectional view of a centrifugal pump embodying the invention.

Referring now more particularly to the drawing wherein like numerals of reference designate the same parts in each of the figures, the numeral 1 designates a centrifugal pump as a whole having the shaft 2 which may be provided with a wearing sleeve 3 therearound and suitably secured thereto.

The end of the pump housing has a tubular extension 4 through which the shaft and wearing sleeve extend axially.

At its outer end the extension 4 is countersunk internally and bolted to the outer end of said extension, there is an outer end cap 5 having on its inner side a thrust seat 6 which fits snugly within the outer end of the extension 4. This seat 6 has an inside annular groove 7 for a purpose to be hereinafter stated.

Figure 5:
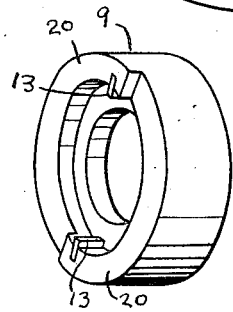
Figure 5 shows a perspective view of the thrust ring.

Fitted over the sleeve 3 and located within the annular chamber 8, which is formed by countersinking the outer end of the extension 4, there is a thrust ring 9, shown more clearly in Figure 5. The inner end of this thrust ring 5 is counterbored thus forming a packing housing to receive the packing 10. This packing closely surrounds the wearing sleeve 3 and tapers outwardly from the thrust ring 9 as shown more clearly in Figure 2.

A packing gland 11 is fitted around the wearing sleeve 3 and its end, adjacent the packing 10, fits over the tapered portion of said packing and is provided with the external grooves 12 which receive the radial inwardly extended blades 13, 13, of the thrust ring 9. These parts are therefore clutched to rotate together and are allowed to move longitudinally relative to each other.

The opposite end of the packing gland 11 has the inside notches 14 and also abuts the adjacent end of the driving sleeve 15 which surrounds the wearing sleeve 3 of the shaft. This adjacent end of said driving sleeve has the lugs 16, 16, which fit into the notches 14, 14 and the opposite end of the driving sleeve has similar lugs 17, 17 which project into external notches 18, 18 of the wearing sleeve 3.

A coil spring 19 surrounds the driving sleeve and is interposed between the externally enlarged end of said driving sleeve, which contains the notches 18, and the facing end of the packing gland 11. This spring maintains the packing 10 under the required compression. Therefore, the shaft 2 and its wearing sleeve will rotate as a unit with the driving sleeve and the packing structure including the thrust ring 9.

The outer end of said thrust ring presents a plane bearing face which bears against the thrust seat 6.

It is to be noted that the opposite face, that is, the inner face, of the thrust ring, has the correspondingly pitched surfaces 20, 20. These surfaces are so pitched that their re-action against liquid which may collect in the chamber 8 will force the outer plane end face of the thrust ring 9 against the thrust seat 6, thus supplementing the pressure of the spring 19.

While the pump is being driven at a relatively slow speed, the compression of the spring 19, acting against the packing gland 11, will ordinarily be sufficient to compress the packing 10 to form an efficient seal.

The outer end cap 5 is provided with a radial bore 21 whose outer end is enlarged and threaded to receive a grease container 22 which may be kept filled with a suitable lubricant and pressure applied thereto by the cap 23 screwed onto said container. The inner end of the bore 21 terminates in the groove 7 whereby said groove may be kept filled with a lubricant. A lubricated seal is thus maintained between the thrust seat 6 and the abutting face of the thrust ring 9.

It may be found desirable to supply a cooling fluid, such as water, to the shaft bearing in the end cap 5. For that purpose a radial duct 24 has been provided leading through the cap to said bearing and whose outer end is internally threaded to receive a hose connection through which the cooling fluid may be supplied to the bearing.

As hereinabove stated, the bore through the housing 4 may be enlarged or counterbored at its outer end forming the annular chamber 8 but this is not in all cases necessary or desirable. The bore through the housing 4 may be of uniform diameter and the thrust ring 9 made of a size to fit therein and the thrust seat 6, in such event, would be correspondingly changed to conform to the size of the thrust ring 9.

Also it is not essential that the wearing sleeve 3 be used. This sleeve may be dispensed with and the packing assembly, hereinabove described, fitted around the shaft itself.

It is to be specially noted that in this type of construction the shaft packing assembly rotates as a unit with the shaft and accordingly there is very little wear on the sleeve, if the sleeve is used, or on the shaft, if the sleeve is dispensed with.

The sleeve 3 is usually of expensive construction and with the type of construction herein described, can be dispensed with or if used, will not be subjected to wear and consequently does not have to often be replaced.

The stuffing box seal hereinabove described may advantageously be used in multiple about the shaft.

The drawing and description are illustrative merely while the broad principle of the invention will be defined by the appended claims.

What I claim is:

1. The combination with a housing, of a rotary element extended axially through the housing, an internal thrust seat around said element, a stuffing box inclosed within the housing and including a thrust ring with packing therein which packing closely surrounds the rotary element and tapers outwardly from the thrust ring, a packing gland fitted around the rotary element with its end adjacent the packing fitting over the tapering portion of the packing, said gland having an external groove, a blade extending radially inwardly from the thrust ring into said groove to clutch the thrust ring and packing gland together, a driving sleeve around the rotary element one end of which abuts said gland, means for clutching said sleeve and gland to cause them to rotate together, the other end of said driving sleeve being clutched with the rotary element, a yieldable member around the driving sleeve which acts against said gland to constantly apply a compressive force radially inwardly to said packing, said thrust ring having a plane bearing face which fits said seat and means for applying a lubricant to said seat and face.

2. The combination with a housing, of a rotary element extended axially through the housing, an internal thrust seat, carried by the end of the housing, around said element, a stuffing box inclosed within the housing and including a thrust ring with packing therein which packing closely surrounds the rotary element and tapers outwardly from the thrust ring, a packing gland fitted around the rotary element with its end adjacent the packing flared and fitting over the tapering portion of the packing, said gland having an external groove and an inside notch, a blade extending radially inwardly from the thrust ring into said groove to clutch the thrust ring and packing gland together, a driving sleeve around the rotary element one end of which abuts said gland, a lug on the sleeve extending into said notch and forming means for clutching said sleeve and gland to cause them to rotate together, the other end of said driving sleeve being clutched with the rotary element, a yieldable member around the driving sleeve which acts against said gland to constantly apply a compressive force radially inwardly to said packing, said thrust ring having a plane bearing face which fits said seat and means for applying a lubricant to said seat and face.

GASPER L. WADDELL.